United States Patent
Hansen et al.

(10) Patent No.: US 11,480,469 B2
(45) Date of Patent: Oct. 25, 2022

(54) METHOD AND SYSTEM FOR UNDERWATER HYPERSPECTRAL IMAGING OF SEABED IMPACTS, ENVIRONMENTAL STATE OR ENVIRONMENTAL FOOTPRINT

(71) Applicant: Ecotone AS, Trondheim (NO)

(72) Inventors: Ingrid Myrnes Hansen, Trondheim (NO); Stefan O. Ekehaug, Tiller (NO); Lars Martin S. Aas, Trondheim (NO)

(73) Assignee: Ecotone AS, Trondheim (NO)

( * ) Notice: Subject to any disclaimer, the term of this patent is extended or adjusted under 35 U.S.C. 154(b) by 0 days.

(21) Appl. No.: 16/760,940

(22) PCT Filed: Nov. 1, 2018

(86) PCT No.: PCT/NO2018/050262
§ 371 (c)(1),
(2) Date: May 1, 2020

(87) PCT Pub. No.: WO2019/088847
PCT Pub. Date: May 9, 2019

(65) Prior Publication Data
US 2020/0300700 A1    Sep. 24, 2020

(30) Foreign Application Priority Data
Nov. 3, 2017   (NO) .................................. 20171749

(51) Int. Cl.
*G01J 3/10*    (2006.01)
*G01J 3/28*    (2006.01)
*B63G 8/00*    (2006.01)

(52) U.S. Cl.
CPC ............ *G01J 3/2823* (2013.01); *B63G 8/001* (2013.01); *G01J 3/10* (2013.01); *B63G 2008/005* (2013.01)

(58) Field of Classification Search
CPC ............ G01J 3/2823; G01J 2003/2826; G01J 2003/2873; B63G 8/001
See application file for complete search history.

(56) References Cited

U.S. PATENT DOCUMENTS

| | | |
|---|---|---|
| 5,604,582 A | 2/1997 | Rhoads et al. |
| 7,369,229 B2 | 5/2008 | Bissett, III et al. |
| 8,502,974 B2 | 8/2013 | Johnsen |
| 9,909,927 B1 * | 3/2018 | Estes ...................... G01S 17/10 |
| 2005/0007448 A1 | 1/2005 | Kaltenbacher et al. |

(Continued)

FOREIGN PATENT DOCUMENTS

WO    2009141622 A1    11/2009

OTHER PUBLICATIONS

International Search Report and Written Opinion dated Jan. 29, 2019 (PCT/NO2018/050262).

(Continued)

*Primary Examiner* — Maurice C Smith
(74) *Attorney, Agent, or Firm* — Alix, Yale & Ristas, LLP

(57) ABSTRACT

Method and system for underwater hyperspectral imaging of seabed impact, environmental state or environmental footprint from natural or man-made sedimentation comprising hyperspectral imaging of ecological, chemical or sediment indicators in an observation area and identifying and classifying ecological, chemical or sediment indicators in the observation area.

11 Claims, 4 Drawing Sheets

(56) References Cited

U.S. PATENT DOCUMENTS

| | | | |
|---|---|---|---|
| 2009/0171591 A1* | 7/2009 | Timmis | G01J 3/14 |
| | | | 702/19 |
| 2011/0205536 A1* | 8/2011 | Johnsen | G01N 21/255 |
| | | | 356/326 |
| 2015/0268178 A1 | 9/2015 | Smith et al. | |

OTHER PUBLICATIONS

Johnsen, Geir et al., "The use of underwater hyperspectral imaging deployed on remotely operated vehicles—methods and applications," Proceedings of 10th IFAC Conference on Control Applications in Marine Systems CAMS, Sep. 13-16, 2016.

Johnsen, G. et al., "Underwater hyperspectral imagery to create biogeochemical maps of seafloor properties," Subsea optics and imaging, Woodhead Publishing, 2013.

Sture, Øystein et al., "Autonomous Underwater Vehicles as a Platform for Underwater Hyperspectral Imaging," Proceedings of Oceans, Aberdeen, Scotland, Jun. 19-22, 2017.

* cited by examiner

METHOD AND SYSTEM FOR UNDERWATER HYPERSPECTRAL IMAGING OF SEABED IMPACTS, ENVIRONMENTAL STATE OR ENVIRONMENTAL FOOTPRINT

BACKGROUND

The disclosure is related to a method for underwater hyperspectral imaging of seabed impacts, environmental state or environmental footprint.

The disclosure is also related to a system for underwater hyperspectral imaging of seabed impacts, environmental state or environmental footprint.

The disclosed embodiments are especially related to a method and system for underwater hyperspectral imaging of seabed impacts, environmental state or environmental footprint from various natural sedimentation or man-made sedimentation.

With the continued expansion of the petroleum industry into the Barents sea, as well as increased demand for Norwegian farmed fish, there is a renewed focus on the environmental footprints from such activities.

In oil and gas-related activities, the side-effects from drilling activities can have impacts on the local marine environment. Associated with the drilling of a well site is the release and deposition of drill cuttings. Drill cuttings consist of broken parts of sub-bottom bedrock rock, and drilling mud. Drilling muds are fluids used to aid the drilling operations. The drilling mud composition varies according to the geological properties of the sub-bottom bedrock, but a common substance is barite or barium sulphate ($BaSO_4$). The amount of drill cuttings will depend on geological formations, drilling depth and amount of drilling mud used, as well as strategies for their disposal of which.

The dispersion of drill cuttings can affect the marine benthic habitats on the surrounding seafloor. The direction of dispersion is heavily influenced by the main current direction in the area. Organisms such as corals, sponges and other immobile species are susceptible to being covered in fine-grained sediments as it can dog feeding and filtering mechanisms. Thus, there are strict guidelines for operations in close proximity to protected species, with a requirement to document before and after effects of the operation.

The main methods for monitoring the effect of these operations are by means of visual inspection using OV photography, video and grab sampling. These methods, while accepted and integrated into the Norwegian Standard system, are both subject to operator bias and time-consuming. Especially physical grab sampling is associated with long processing time post-survey. Thus, there is an increasing call for technological advances to streamline and improve the method of monitoring to reduce costs in connection with survey time as well as extended laboratory work. There is also a call for improved environmental monitoring in the aquaculture industry. Waste and depositions in form of uneaten fish feed and feces rely on ocean currents to be transported away from the farm and diluted enough to minimize the environmental impact. Today's method relies on physical point sampling around the fish pens and in the recipient area of the farm using grabs followed by faunal analysis. While the methodology is solid and selection of sample sites based on current direction, point sampling has an inherent risk of hitting non-representative areas, providing a skewed image of the environmental status. It's also labor intensive and requires weeks or months of work to analyze.

Due to industrial emissions, there are many harbor basins and fjords with sediments containing high levels of polyaromatic hydrocarbons (PAHs), polychlorinated biphenyl (PCB), heavy metals and other contaminants (ef Norwegian Environment Agency). A management approach towards this situation, is remediation of the sea floor, which involves removal of the contaminated sediments, or capping the contaminated layer with a new and healthy sediment layer. The biological active layer of seafloor sediments is restricted to the upper 5-50 cm. Hence, the removal or replacement of this layer, will leave the remaining sediments available for re-colonization through immigration of pioneering organisms, establishing a community. This will typically be followed by new settlements and replacement of communities until a stable community is established, a process known as succession. In order to assess the effects and efficiency of the remediation measures, it is necessary to imply monitoring routines. The monitoring must span from the time prior to the remediation event and follow the area through the succession stages. There are several examples of that the seabed in fjords is used as dumping location for waste rock, mine waste and tailings from mines or other land based industry. This can have an effect of the seafloor biological community, although the extent of the effects are unknown. In order to assess the effects of sea depositions of mine waste, seafloor mapping and monitoring must be carried out.

Multispectral sensors have been used in research into aquatic (freshwater, brackish water and salt water) environments for about 30 years. Multispectral sensors usually have more than three discrete color bands, and so give more detailed spectral information compared to regular digital color cameras. They have typically been carried by satellites, airplanes, buoys and boats to analyze upwelling radiance remotely, and in underwater vehicles to measure both upwelling and downwelling radiance in situ. In the first case, the light measured by the sensor comes from natural illumination that is incident on the water (passive remote sensing), while in the latter case, lamps for illumination is carried alongside the sensor (active remote sensing). Hyperspectral sensors have better wavelength resolution and more wavebands than multispectral sensors. A hyperspectral imager (also known as an imaging spectrometer, imaging spectroscope, imaging spectroradiometer, superspectral or ultraspectral imager), can determine the light intensity from each point or pixel of a scene for each of a lame number (typically hundreds) of wavelength bands. This camera can thus be used to acquire more spectral information about the scene than multi-spectral and standard color cameras. Because hyperspectral imagers give such detailed spectral information for each pixel in the image, independently of each other, it is possible to identify regions containing types of matter, such as chemical substances and organisms, by using their known unique spectra. Applications for hyperspectral imagers include mineral exploration, agriculture, archeology, astronomy and environmental monitoring. They are typically used in airplanes (so-called "remote sensing"). An overview of the use of hyperspectral sensors in oceanography is given is "The New Age of Hyperspectral Oceanography" by Chang et al. in Oceanography, June 2004, pp. 23-29. WO 2005/054799 discloses the use of a hyperspectral imager from airborne platforms to observe coastal marine environments remotely. The use of an airborne hyperspectral imager for mapping kelp forest distribution close to the shore is described in "Kelp forest mapping by use of airborne hyperspectral imager" by Volent et al. in Journal of Applied Remote Sensing, Vol. 1, 011503 (2007).

EP2286194 B1 discloses an apparatus for placement on or in a body of water for hyperspectral imaging of material in the water. The apparatus comprises an artificial light source and a hyperspectral imager. These are arranged so that in use light exits the apparatus beneath the surface of the water and is reflected by said material before re-entering the apparatus beneath the surface of the water and entering the hyperspectral imager. The hyperspectral imager is adapted to produce hyperspectral image data having at least two spatial dimensions.

A drawback of this latter solution, and other prior art, is that the analysis stages relies on a database of spectral profiles for identification of the objects imaged by the underwater hyperspectral imager. However, in the situations described here, the interest is not only restricted to identify materials or objects, but also to detect changes, either in a temporal or spatial pattern. There is no general spectral profile associated with change. Further, there is a need to detect not only objects or materials, but also properties or environmental state associated with that object. The latter solution is not adapted for this purpose. Accordingly, the latter solutions are not suitable for hyperspectral imaging of seabed impact, environmental state or environmental footprint from natural or man-made sedimentation.

Hence, there is a need for a method and system for underwater hyperspectral imaging of seabed impacts, environmental state or environmental footprint from natural or man-made sedimentation.

SUMMARY

The embodiments disclosed herein provide a method and system for underwater hyperspectral imaging of seabed impacts, environmental state or environmental footprint partly or entirely solving the mentioned drawbacks of prior art. The disclosed embodiments also provide a method and system for underwater hyperspectral imaging of seabed impacts, environmental state or environmental footprint for detecting and classifying ecological, chemical or sediment indicators on the seabed.

Disclosed herein is a method and system for underwater hyperspectral imaging of seabed impacts, environmental state or environmental footprint for detecting and classifying one or more of the following: benthic organisms, traces of organisms, bioturbation, traces of burrowing fauna, biofilm, organic and inorganic materials, color of sediment, composition and type of sediment, grain size of sediments.

The disclosed embodiments also provide a method and system for underwater hyperspectral imaging of seabed impacts, environmental state or environmental footprint adapted for being arranged to an underwater vehicle, imaging seabed along a transect direction from a center of natural or man-made sedimentation.

The disclosed embodiments also provide a method and system for underwater hyperspectral imaging of seabed impacts, environmental state or environmental footprint adapted for being arranged to an underwater vehicle, imaging seabed at the same geographic area at several time points (two or more) in order to detect potential changes over time. This can be done before and after a disturbance event.

The disclosed embodiments also provide a method and system for underwater hyperspectral imaging of seabed impacts, environmental state or environmental footprint adapted for being arranged to an underwater vehicle, imaging seabed in both a natural or man-made sedimentation area (disturbed area) and a comparable reference area at another geographic location in order to detect potential effects from the disturbance.

Also provided is a method and system for underwater hyperspectral monitoring of seabed impacts, environmental state or environmental footprint arranged for compensating water optical effects.

Provided herein is a method and system for underwater hyperspectral imaging of seabed impacts, environmental state or environmental footprint from natural or man-made sedimentation capable of detecting and classifying the seabed impacts, environmental state or environmental footprint by means of hyperspectral imaging.

By natural or man-made sedimentation is herein defined as sediments or depositions from aquaculture installations as fish farms, oil or gas related drilling operations, sea floor depositions of sediments from industrial activities (e.g. mining), or imaging of sediment remediation (physical removal of contaminated sediments or placing new uncontaminated sediments above a layer of contaminated sediment).

A major challenge in visual assessments is the fact that both drill cuttings and natural sediments can be very similar in color and therefore the human eye with its Red-Blue-Green visual perception may not be able to detect low-level deposition. Hyperspectral imagery (HI), on the other hand, uses the full spectral range of light and thus is able to distinguish color nuances which the human eye cannot.

The disclosed embodiments are based on detecting the presence of seabed impact, environmental state or environmental footprint from natural or man-made sedimentation at the seabed by using an automated method of underwater image recognition. Provided herein is a method and system for detection of natural or man-made sedimentation on the seabed using underwater hyperspectral imagery (UHI) technology.

A method for underwater hyperspectral monitoring of seabed impacts, environmental state or environmental footprint from natural or man-made sedimentation comprises arranging an underwater hyperspectral imager to an underwater vehicle and moving the underwater hyperspectral imager along a transect direction from center of the natural or man-made sedimentation, which can also be referred to as disturbance center, i.e. from where the sedimentation or depositions are distributed due to currents, or moving the underwater hyperspectral imager along a transect direction in both a natural or man-made sedimentation area and in a separate comparable reference area at another location. The method further comprises at sampling stations along the transect direction/gradient (i.e. spatial pattern) performing hyperspectral imaging of ecological, chemical or sediment indicators in an observation area on the seabed and identifying and classifying ecological, chemical or sediment indicators in the observation area at each sampling station by comparison with spectral signatures of ecological, chemical or sediment indicators stored in a database. This includes one or more of the following: benthic organisms, traces of organisms, bioturbation, traces of burrowing fauna, biofilm, organic and inorganic materials, color of sediment, composition and type of sediment, grain size of sediments, and similar.

According to a further embodiment, the method further comprises defining measurements at a first sampling station close to the center of natural or man-made sedimentation as a first reference sample, performing a number of successive measurements at successive sampling stations along the transect direction/gradient, and defining measurements at a final sampling station far from the center of the natural or man-made sedimentation as a second reference sample, or defining measurements from sampling stations at natural or man-made sedimentation area as a first reference sample, and defining measurements at a separate comparable reference area at another location as a second reference sample. The first reference point is considered to represent a reference area with high content of sediments/depositions while the second reference sample far from the (center of) natural or man-made sedimentation is considered to represent a reference area free of seabed impact or environmental footprint.

In a further embodiment, the method comprises taking the mentioned reference sample(s) also in a temporal pattern by performing repeated measurements of the mentioned reference sample(s) at different points in time. This can be achieved by that one perform a measurement of a reference sample at time A (e.g. prior to a disturbance event) and repeat measurement of a reference sample at the same geographic location at time B (e.g. after a disturbance event).

According to a further embodiment, the method comprises taking a sample in an area subject to the disturbance event and a reference sample at comparable geographic location(s) that is too far away to be affected by the disturbance event.

In a further embodiment, the method further comprises comparing measurements of the sampling stations with the first and second reference samples to provide a gradient from disturbed to reference conditions (in time or space or both), and vice versa. According to a further embodiment, the method further comprises comparing measurements of the sampling stations at different time points to provide a time gradient over the conditions in the area.

In a further embodiment, the method further comprises comparing measurements of the sampling stations in a potentially disturbed area to see if there are any differences in conditions between area subject to disturbance and area that is not subject to disturbance.

According to a further embodiment, the method comprises performing hyperspectral imaging of ecological, chemical or sediment indicators by means of the underwater hyperspectral imager comprising at least one illumination source and at least one hyperspectral imager, providing a raw 2D projection of the convolution of the at least one illumination source and at least one hyperspectral imager and spectral properties of a section (frame) of the observation area on the seabed by moving the at least one illumination source and hyperspectral imager in relation to the observation area by means of an underwater vehicle. The method further comprises repeating the measurements along different transect direction from the starting point or performing the measurements along parallel transect directions.

In a further embodiment, the method comprises choosing the transect direction based on disturbance/current measurement or map of the area around the natural or man-made sedimentation area.

The disclosed method further comprises, for each sampling station, measure one or more of:
Position (Centre of OV/AUV)
Time
Attitude (Heading, pitch and roll)
Depth
Altitude (Distance between image sensor and seafloor)
Current direction
Flight direction According to a further embodiment, the method comprises performing a survey in, with the starting point as center of the natural or man-made sedimentation area, in north-easterly, south-easterly, south-westerly and north-westerly directions.

According to a further embodiment, the method comprises aligning the survey line in a main current direction.

As disclosed herein, the movement of underwater vehicle, which typically will be a ROV or AUV, through the observation area, at each sampling station, is used to build a two-dimensional image of the ecological, chemical or sediment indicators in the observation area. As the underwater vehicle moves along the transect direction over the observation area at each sampling station (sampling station) the at least one hyperspectral imager captures sequential frames as the underwater hyperspectral imager by means of the underwater vehicle moves in relation to the observation area. The sequential frames can be processed and composed to generate a complete image (hypercube) of the ecological, chemical or sediment indicators in the observation area. If desired, this complete image (hypercube) can be used to generate two-dimensional flat greyscale images indicating light intensity at each pixel for a given single optical wavelength range. Accordingly, by utilizing the movement of the underwater hyperspectral imager, a complete image of the ecological, chemical or sediment indicators in the observation area can be captured.

According to a further embodiment, the method comprises spectral correction of optical properties of the water. As disclosed, this is achieved by using measurements of the optical properties of water to model the statistical distribution of the optical properties of the water to each pixel in the complete image of the ecological, chemical or sediment indicators in the observation area. Further, this contribution is subtracted from the optical properties in the complete image of the ecological, chemical or sediment indicators in the observation area to provide a spectral image of the ecological, chemical or sediment indicators in the observation area For measurement of the optical properties of the water, the method comprises using a separate illumination source, such as a lamp, illuminating a desired light spectrum, and a detector arranged at a known distance from the separate illumination source to determine attenuation coefficient of water which can be used as spectral correction parameters for subtraction.

The method for underwater hyperspectral monitoring of seabed impacts, environmental state or environmental footprint further comprises identifying and classifying ecological, chemical or sediment indicators of interest on the seabed. This is achieved by comparing the spectral image of the ecological, chemical or sediment indicators in the observation area of the seabed, at each sampling station, with spectral signatures from one or more databases to classify all pixels in the spectral image.

The method can further comprise identifying and classifying objects, such as benthic organisms, in the observation area by extracting each object by grouping connected pixels of same identified class.

According to a further embodiment of the method for underwater hyperspectral imaging of seabed impacts, environmental state or environmental footprint, the method further comprises identifying and classifying the absence or presence of the change in one or more of the following: benthic organisms, traces of organisms, bioturbation, traces of burrowing fauna, biofilm, organic and inorganic materials, color of sediment, composition and type of sediment, grain size of sediments, by comparing the spectral image of the ecological, chemical or sediment indicators in the observation area of the seabed, at each sampling station, with spectral signatures for benthic organisms, traces of organisms, bioturbation, traces of burrowing fauna, biofilm, organic and inorganic materials, color of sediment, composition and type of sediment, grain size of sediments from a database.

The method can further comprise monitoring each of the above mentioned embodiments over time.

The collection of information obtained from the method can in turn be used to make decisions on actions to secure animal welfare and reduce the risk of contamination to other observation areas and to the wild.

A system for underwater hyperspectral imaging of seabed impact, environmental state or environmental footprint from natural or man-made sedimentation comprises an underwater hyperspectral imager (UHI) comprising at least one illumination source and at least one hyperspectral imager for hyperspectral imaging of ecological, chemical or sediment indicators in an observation area of interest on the seabed, where the UHI is arranged to an underwater vehicle, such as a OV or UAV, wherein the underwater vehicle is arranged to move the UHI along a transect direction from a natural or man-made sedimentation area or transect direction in both a natural or man-made sedimentation area and in a separate comparable reference area at another location, as well as, at sampling stations along the transect direction moving the UHI in relation to the observation area providing a raw 2D projection of the convolution of the at least one illumination source and at least one hyperspectral imager and spectral properties of ecological, chemical or sediment indicators in the observation area at each sampling station.

The underwater vehicle will be provided with propulsion means and a control system for moving in a transect direction, as well as in relation to the seabed, as regards, height above the seabed and direction (heading).

The system further comprises a control unit provided with means and/or software for utilizing movement of the UHI in relation to the observation area to build a two dimensional image of ecological, chemical or sediment indicators in the observation area from sequential sections of the ecological, chemical or sediment indicators in the observation area captured by the at least one hyperspectral imager as the UHI is moved in relation to the observation area and processing and composing the sequential sections to generate a complete image of the ecological, chemical or sediment indicators in the observation area at each sampling station.

The control unit for the system can further be provided with means and/or software for identifying and classifying objects, such as benthic organisms, in the complete image by evaluating connected pixels in the complete image having a certain intensity threshold, and extracting area around the object in the complete image having intensity lower than the intensity threshold.

In a further embodiment, the system further comprises a device for measuring optical properties of water formed by at least one separate illumination source and at least one detector, arranged at a known distance from each other.

According to a further embodiment, the control unit is provided with means and/or software for, based on the measured optical properties of the water, model the statistical distribution of the optical properties of the water to each pixel in the complete image of the ecological, chemical or sediment indicators in the observation area, providing an attenuation coefficient spectrum, and subtracting this attenuation coefficient spectrum from the optical properties in the complete image of the identified ecological, chemical or sediment indicators to provide a spectral image of the ecological, chemical or sediment indicators in the observation area.

In yet a further embodiment, the control unit further is provided with means and/or software for accumulating spectral images of ecological, chemical or sediment indicators at various distances by utilizing the attenuation coefficient spectrum by projecting the attenuation coefficient spectrum on all spectra and estimate statistical contribution of the attenuation coefficient spectra on all ecological, chemical or sediment indicators in the complete image checking if the contribution is continuous and if that is the case, the contribution of the attenuation coefficient spectrum can be subtracted on every single pixel to provide a standardized spectral image of ecological, chemical or sediment indicators in the complete image.

According to a further embodiment of the control unit for the system is further provided with means and/or software for identifying absence or presence of the change in ecological, chemical or sediment indicators, such as one or more of the following: benthic organisms biofilm and bioturbation, sediment color or sediment composition on the complete image of the ecological, chemical indicators in the observation area by classifying all pixels in an image by comparison with spectral signatures of benthic organisms, biofilm and bioturbation, sediment color or sediment composition stored in a database.

In a further embodiment, the system comprises at least one database holding spectral signatures for ecological, chemical or sediment indicators, such as benthic organisms, traces of organisms, bioturbation, traces of burrowing fauna, biofilm, organic and inorganic materials, color of sediment, composition and type of sediment, grain size of sediments, and the control unit is provided with means and/or software for comparing the spectral image or standardized spectral image of the ecological, chemical or sediment indicators in the observation area with spectral signatures for benthic organisms, traces of organisms, bioturbation, traces of burrowing fauna, biofilm, organic and inorganic materials, color of sediment, composition and type of sediment, grain size of sediments in the database.

Accordingly, disclosed herein is a method and system for underwater hyperspectral monitoring of seabed impacts, environmental state or environmental footprint capable of quantifying the extent ecological, chemical or sediment in the surrounding environment of natural or man-made sedimentation areas.

Underwater Hyperspectral Imaging according to the disclosure is a novel approach to environmental mapping of the seabed. By using high resolution spectral imaging, the disclosed embodiments provide technology analysis of the reflected light to find and identify ecological, chemical or sediment indicators on the seabed. For the fish-farm approach, the proposed method will use ecological and chemical indicators to determine the health of the surrounding environment. Indicators include absence or presence in the change of benthic organisms, biofilm and bioturbation, sediment color and sediment composition.

BRIEF DESCRIPTION OF THE DRAWINGS

The present invention will below be described in further detail with references to the attached drawings, where.

DETAILED DESCRIPTION

Figure 1:
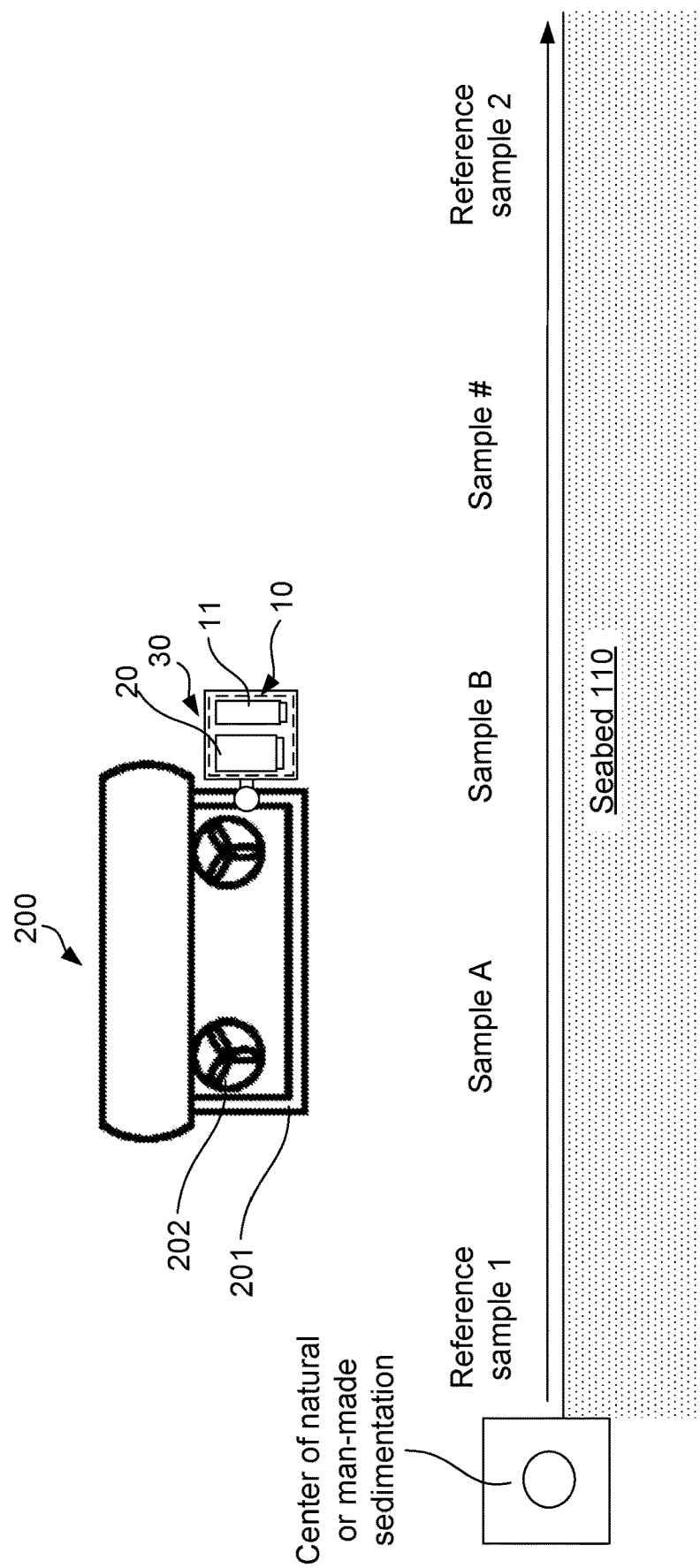
FIG. 1 is a principle drawing of an application area for use of the disclosed embodiments.
Figure 2:
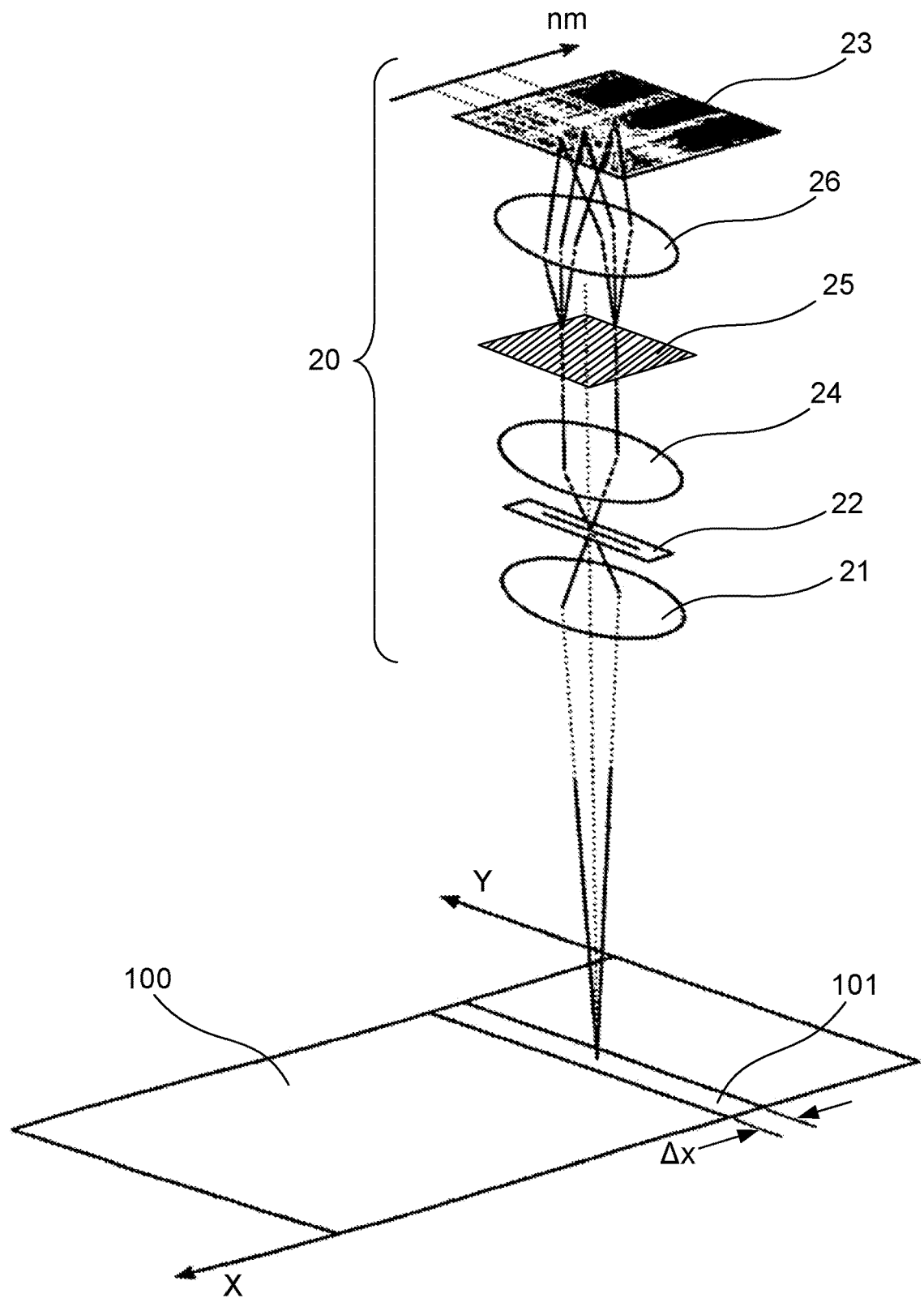
FIG. 2 is a principle drawing of is a schematic, perspective drawing of the principle components of a hyperspectral imager as used in embodiments of the disclosure.

Reference is first made to FIG. 1 showing a principle drawing of a system for hyperspectral monitoring of seabed impact, environmental state or environmental footprint arranged to an underwater vehicle 200, such as a submersible Remotely Operated Vehicle (ROV). The system comprises an underwater hyperspectral imager 10 comprising at least one illumination source 11 and at least one hyperspectral imager 20 arranged to a mounting assembly 30 for arrangement, fixed or movable, to a support structure 201 of the underwater vehicle 200. The underwater vehicle 200 will be provided with propulsion means 202, such as thrusters, as well as a control system for operating the thrusters 202. The at least one illumination source 11 and at least one hyperspectral imager 20 can be arranged side by side, or over or under each other such that they exhibit an angle in relation to each other in relation to an observation area 100 (FIG. 2).

The underwater hyperspectral imager 10 can be provided with several illumination sources 11 which can be used individually or in combination to provide a customized illumination. This can be used to minimize the effects of absorption and scattering in the water between the illumination source 11, observation area 100 on the seabed 110 and the hyperspectral imager 20, and can also ensure that the correct wavelengths in the observation area 100 on the seabed 110 are excited.

The illumination source 11 can e.g. be formed by a plurality of light emitting diodes (LED) which can be selectively illuminated. E.g. some of the LEDs can preferably be white, emitting light in the 350-800 nm range, others can preferably be blue, emitting light in 370-500 nm range or green, emitting light in 500-600 nm range or red, emitting light in 600-700 nm range.

The hyperspectral imager 20 can e.g. be a hyperspectral microscopic imager as described in EP2286194 B1.

Figure 3:
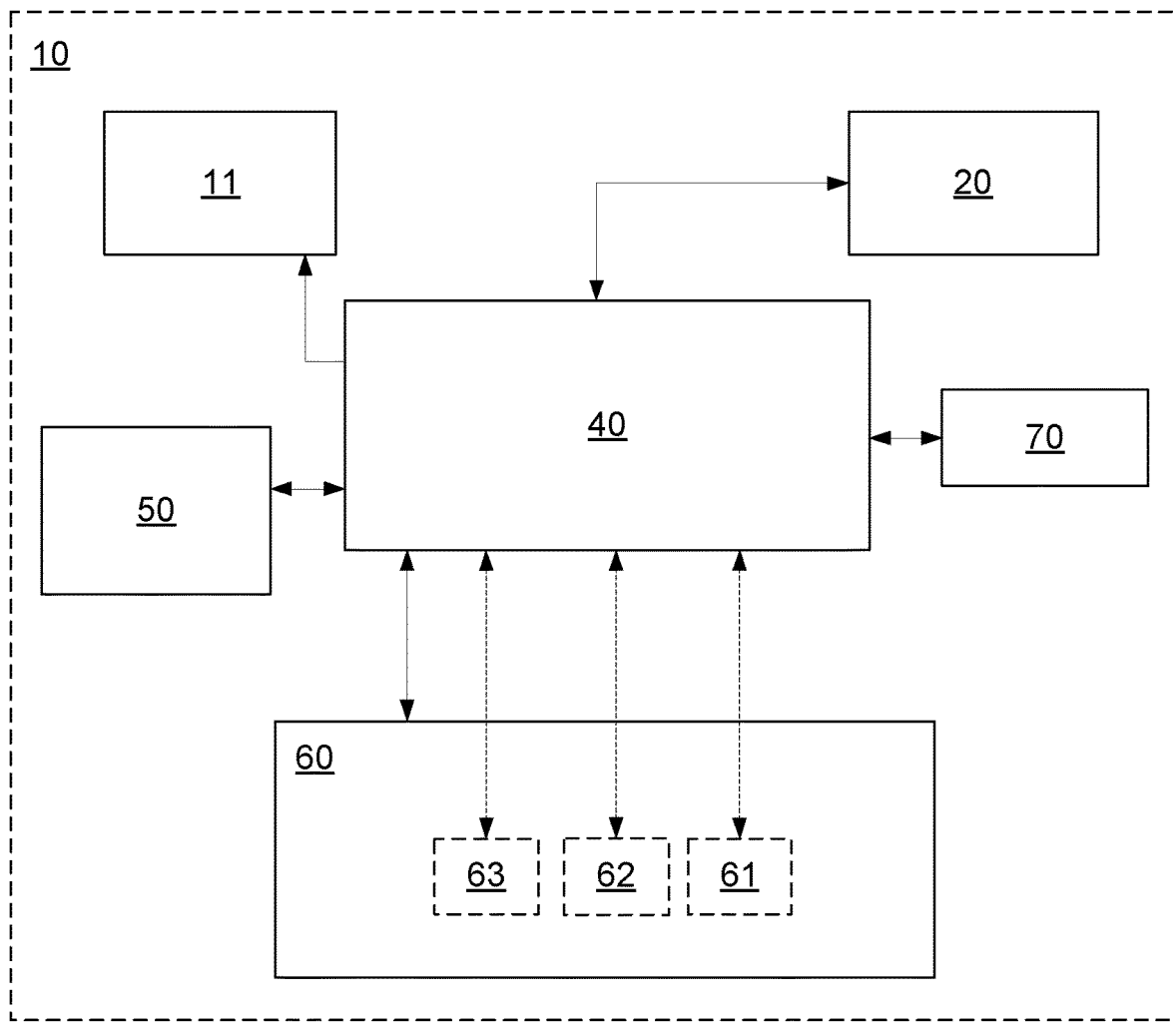
FIG. 3 is a block diagram of a disclosed system.

By using several, at least two, hyperspectral imagers 20, one can achieve stereoscopic vision and achieve reliable estimation of the distance to the observation area 100 in addition to estimation of the size/volume of ecological, chemical or sediment indicators in the observation area 100. When using several hyperspectral imagers 20, the hyperspectral imagers 20 will be arranged to observe the observation area 100 from different angles. The use of at least two hyperspectral imagers 20 observing an observation area 100 from at least two different angles will also result in higher detection rate for ecological, chemical or sediment indicators in the observation area 100 due to the hyperspectral imagers 20 are observing the ecological, chemical or sediment indicators (observation area 100) from at least two angles. Reference is now made to FIG. 2 which is a schematic, perspective drawing of the principle components of a hyperspectral imager 20 as used in embodiments of the disclosure. The hyperspectral imager 20 is arranged to form an image having two spatial dimensions, as will be described with reference to FIG. 2. FIG. 2 shows how light passes from an observation area 100 of interest through the optics of a push-broom hyperspectral imager during the capture of a single frame. Only a thin section 101 of the observation area 100 is imaged during each time frame, extending in the direction of the Y axis and having width ΔX. Light from the observation area 100 first passes through an objective lens 21 which focuses it through a spatial slit 22. The spatial slit 22 excludes light other than that emanating from the section 101. Its width is set to relate desired width ΔX to the width of a single row of pixels of a CCD image sensor 23. A collimating lens 24 then directs light through a dispersive grating 25 arranged to create a dispersed spectrum. The spectral dispersion occurs over the X axis, orthogonal to the spatial dimension Y of the section 101. A camera lens 26 then focuses the spectrally dispersed light onto the CCD image sensor 23. The disclosed method and system utilize the movement of the underwater vehicle 200 and thus underwater hyperspectral imager 10 to build up a two-dimensional image of ecological, chemical or sediment indicators in the observation area 100. By that the underwater hyperspectral imager 10 is set up with a lateral field of view, there is no need for the objective lens 21 and other optics to be moved laterally relative to the observation area 100 in the direction of the X axis. The sequential sections 101 (frames) of ecological, chemical or sediment indicators in relation to the observation area 100 can be processed and composed to generate a complete image or a hypercube. If desired, this hypercube can be used to generate two-dimensional flat greyscale images indicating light intensity at each pixel for a given single optical wavelength range. The wavelength resolution of the system is determined by the number of pixels on the CCD sensor 23 in the direction of the X axis. Reference is now made to FIG. 3 showing a block diagram of a system according to the disclosure. The system is further provided with a control unit 40 in the form of a CPU or similar, provided with internal and/or external memory. The control unit 40 is provided with means and/or software for controlling the at least one illumination source 11 and the at least one hyperspectral imager 20. By means of the at least one illumination source 11 and at least one hyperspectral imager 20 a raw 2D projection of the convolution of the at least one illumination source 11 and the at least one hyperspectral imager 20 and spectral properties of a section 101 of ecological, chemical or sediment indicators in the observation area 100. As the underwater vehicle 200 moves, in X-direction in FIG. 2, which will be along the transect direction, one can achieve a number of section images which can be processed and composed to form a complete image of ecological, chemical or sediment indicators in relation to the observation area 100. The control unit 40 can further be provided with means and/or software for evaluating connected pixels above a certain intensity threshold, as described above, accordingly identifying the ecological, chemical or sediment indicators in the observation area 100. Based on this the control unit 40 can further be provided with means and/or software for extracting area around each ecological, chemical or sediment indicator based on the evaluation of connected pixels, where pixels with a certain intensity threshold will represent an ecological, chemical or sediment indicator in the observation area 100.

Figure 4:
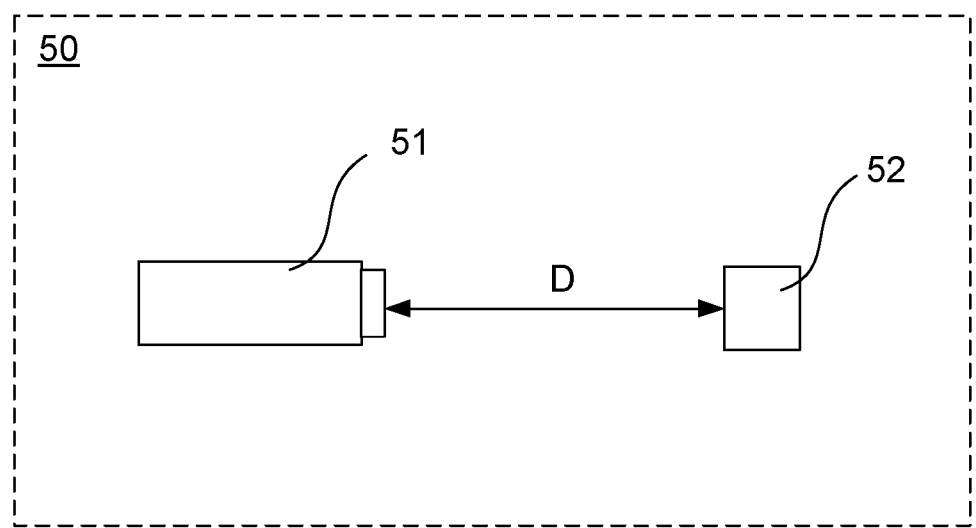
FIG. 4 is a principle drawing of a device for measuring optical properties of water.

Reference is now made to FIG. 4. According to a further embodiment, the system further comprises a device 50 for measuring optical properties of water. The device 50 for measuring optical properties of water is e.g. formed by at least one separate illumination source 51 and at least one detector 52, arranged at a known distance D from each other. Further, both the separate illumination source 51 and detector 52 can be controllable or fixed. By means of the device 50 measuring optical properties of water, measurement can be made to model the statistical distribution of the optical properties of the water to each pixel in the complete image of identified ecological, chemical or sediment indicator in the observation area 100, providing an attenuation coefficient spectrum. Further, this contribution can be subtracted from the optical properties in the complete image of the identified ecological, chemical or sediment indicator to provide a spectral image of the identified ecological, chemical or sediment indicator.

Further, the spectrum of light emanating from the illumination source 11 can be tuned by selecting which LEDs to activate, depending on the optical properties of the water (which vary with distance to the target object due to the spectral attenuation coefficient of water, and which can vary due to optically-active components such as phytoplankton, colored dissolved organic matter and total suspended matter).

The control unit 40 can further be provided with means and/or software for accumulating spectral images of ecological, chemical or sediment indicators at various distances by utilizing the above attenuation coefficient spectrum. By projecting the attenuation coefficient spectrum on all spectra and estimate statistical contribution of the attenuation coefficient spectra on all ecological, chemical or sediment indicators in the complete image one can check if the contribution is continuous and if that is the case, the contribution of the attenuation coefficient spectrum can be subtracted on every single pixel to provide a standardized spectral image of ecological, chemical or sediment indicators in the complete image.

Reference is now again made to FIG. 3. The system further comprises at least one database 60 stored in the internal or external memory holding spectral signatures of ecological, chemical or sediment indicators. In an alternative embodiment, the system comprises separate databases holding spectral signatures for ecological 61, chemical 62 and sediment 63 indicators. The control unit 40 is further provided with means and/or software for classifying all pixels in a standardized image or complete image according to the signatures stored in the database 60-63, and can further be provided with means and/or software for extracting each ecological, chemical or sediment indicators as an object. Examples of this can be as benthic organisms, biofilm and bioturbation, sediment color and sediment composition. Accordingly, by means of the disclosed embodiments, each benthic organisms, traces of organisms, bioturbation, traces of burrowing fauna, biofilm, organic and inorganic materials, color of sediment, composition and type of sediment, grain size of sediments in the observation area can be identified.

All information is then stored in the internal or external memory of the control unit 40 and can further be reported to a user by means of that the system is provided with a wired or wireless communication device 70 or that it is connected to a communication device of the underwater vehicle 200. In the shown application area in FIG. 1, the underwater hyperspectral imager 10 is arranged to an underwater vehicle 200 in the form of a ROV. By moving the underwater vehicle 200 and thus the underwater hyperspectral imager 10 in a transect direction above the seabed 110 measurements can be made by the hyperspectral imager 10, either continuously or at desired interval, at sampling stations. The measurement strategy according to one embodiment further comprises moving the underwater vehicle 200 and thus hyperspectral imager 10 in transect direction from a center of a natural or man-made sedimentation area, such as a drilling site or fish farm, and making a first reference sample close to the center of the natural or man-made sedimentation area, performing a number of successive measurements at successive sampling stations, and making a second reference sample as an ending of the measurement strategy. The measurement strategy according to a second embodiment comprises moving the underwater vehicle 200 and thus hyperspectral imager 10 along a transect direction both in a natural or man-made sedimentation area (disturbed area), such as a drilling site or fish farm, and a separate comparable reference area at another location, wherein measurements from sampling stations at the natural or man-made sedimentation area are defined as first reference sample and measurements at the comparable reference area at another location is defined as a second reference sample, hence enabling detection of differences in condition between disturbed natural or man-made sedimentation area and non-disturbed area.

In addition, the reference samples can be made in a temporal pattern by that one use the OV to return to the same geographic location for the reference samples at a different time to perform the reference measurements again.

This can be repeated for different transect directions from the natural or man-made sedimentation area or at natural or man-made sedimentation area and comparable reference area, hereunder also at parallel transect directions.

By means of comparison of the measuring samples from the sampling stations with the reference samples, in time or space, or both, a visual presentation of the extent of environmental affection of the seabed can be presented. E.g. the results can be presented as a color diagram in relation to length from the center of the natural or man-made sedimentation area.

Accordingly, the disclosed embodiments provide a real-time/in situ identification and classification of ecological, chemical or sediment indicators by hyperspectral imaging which will give an expression of seabed impact, environmental state or environmental footprint caused by natural or man-made sedimentation. By the disclosed embodiments, it may be provided a geographical gradient of natural or man-made sedimentation.

The embodiments provide the opportunity to establish natural or man-made sedimentation by comparison of measurements of a reference area with measurements of a disturbed area.

The disclosed embodiments allow measuring before and after a disturbance event, providing time monitoring of an area.

The disclosed embodiments provide an opportunity for combined time monitoring and geographical gradient.

The invention claimed is:

1. A method for underwater hyperspectral imaging of seabed (110) impact, environmental state or environmental footprint from sedimentation in a sedimentation area, wherein a sedimentation area comprises a first transect direction, and a separate comparable reference area at another location comprises a second transect direction, comprising the steps of:
   (a) arranging an underwater hyperspectral imager (10) to an underwater vehicle (200);
   (b) moving the underwater vehicle (200) and underwater hyperspectral imager (10) along the first transect direction from an approximate center of the sedimentation area;
   (c) identifying one or more sampling stations along the first transect direction;
   (d) performing hyperspectral imaging of one or more of ecological, chemical and sediment indicators in an observation area (100) on the seabed (110) at each of the one or more sampling stations;

(e) identifying and classifying one or more of ecological, chemical and sediment indicators in the observation area (100) at each of the one or more sampling stations by comparing the hyperspectral imaging from step (d) with spectral signatures of one or more of ecological, chemical and sediment indicators from the reference area stored in a database (60-63).

2. The method according to claim 1, further comprising the steps of:
(i) defining measurements at a first sampling station proximate the approximate center of the sedimentation area as a first reference sample, performing a plurality of successive measurements at successive sampling stations along the first transect direction, and defining measurements at a final sampling station further from the center of the sedimentation area as a second reference sample, or
(ii) defining measurements from sampling stations at a disturbed sedimentation area as a first reference sample and defining measurements at a separate comparable non-disturbed reference area at another location as a second reference sample, thereby detecting differences in condition between disturbed sedimentation area and a non-disturbed area.

3. The method according to claim 2, comprising taking the one or more reference samples in a temporal pattern by performing repeated measurements of the one or more reference samples at different points in time.

4. The method according to claim 2, further comprising comparing measurements of the sampling stations with the first and second reference samples to provide a gradient from disturbed to reference conditions, in time or space or both, and vice versa.

5. The method according to claim 1, wherein the underwater hyperspectral imager (10) comprises at least one illumination source (11) and at least one hyperspectral imager (20) providing a raw 2D projection of a convolution of the at least one illumination source (11) and at least one hyperspectral imager (20) and spectral properties of a section (101) of the observation area (100) on the seabed (110) by moving the at least one illumination source (11) and at least one hyperspectral imager (20) in relation to the observation area (100) on the seabed (110) at each sampling station via the underwater vehicle (200).

6. The method according to claim 5, further comprising:
moving the at least one illumination source (11) and hyperspectral imager (20) in relation to the observation area (100) at each sampling station to build a two-dimensional image of the ecological, chemical or sediment indicators by capturing sequential sections (101) of the ecological, chemical or sediment indicators on the seabed (110) as the at least one illumination source (11) and at least one hyperspectral imager (20) move in relation to the observation area (100) on the seabed (100); and
processing and composing the sequential sections (101) to generate a complete image of the ecological, chemical or sediment indicators on the seabed (110), at each sampling station.

7. The method according to claim 1, comprising identifying and classifying ecological, chemical or sediment indicators on the complete image of the identified ecological, chemical or sediment indicators by classifying all pixels in the complete image by comparison with spectral signatures of ecological, chemical or sediment indicators stored in the database (60-63).

8. The method according to claim 6, comprising performing spectral correction by the steps of:
performing measurements of optical properties of water to model statistical distribution of the optical properties of the water to each pixel in the complete image of the ecological, chemical or sediment indicators, and
subtracting this distribution from the optical properties in the complete image of the ecological, chemical or sediment indicators to provide a spectral image of the ecological, chemical or sediment indicators.

9. The method according to claim 8, wherein performing measurements of optical properties of the water is performed by using a separate illumination source (51) illuminating a desired light and a detector (52) arranged at a known distance (D) from the separate illumination source (51) to determine attenuation coefficient of water which can be used as spectral correction parameter for subtraction.

10. The method according to claim 1, further comprising accumulating spectral images of ecological, chemical or sediment indicators at various distances, and using a determined attenuation coefficient to project the determined attenuation coefficient spectrum on all spectra and estimate the statistical contribution of the attenuation coefficient spectra to all spectra on all ecological, chemical or sediment indicators in the complete image of identified ecological, chemical or sediment indicator.

11. The method according to claim 10, further comprising determining if the contribution is continuous, and if the contribution is continuous, subtracting the contribution of the attenuation coefficient spectra on every pixel of the complete image, resulting in a standardized spectral image.

* * * * *